United States Patent [19]
Ayerst

[11] Patent Number: 6,141,535
[45] Date of Patent: Oct. 31, 2000

[54] COMMUNICATION SYSTEMS FOR CONTROLLING REGISTRATION OF SELECTIVE CALL DEVICES

[75] Inventor: Douglas I. Ayerst, Delray Beach, Fla.

[73] Assignee: Motorola, Inc., Schaumburg, Ill.

[21] Appl. No.: 09/312,871

[22] Filed: May 17, 1999

[51] Int. Cl.[7] .............................. H04Q 7/00; H04Q 7/20
[52] U.S. Cl. .................. 455/31.1; 455/435; 455/525; 340/825.44
[58] Field of Search ...................... 455/422, 432, 455/434, 435, 436, 31.1, 228; 340/825.44, 825.36, 539

[56] References Cited

U.S. PATENT DOCUMENTS

| | | |
|---|---|---|
| 4,972,355 | 11/1990 | Mullins ................................... 455/435 |
| 5,097,499 | 3/1992 | Cosentino ............................... 455/435 |
| 5,588,043 | 12/1996 | Tiedemann, Jr. et al. .............. 455/435 |
| 5,629,975 | 5/1997 | Tiedemann, Jr. et al. .............. 455/435 |
| 5,649,289 | 7/1997 | Wang et al. . |
| 5,666,652 | 9/1997 | Lin et al. . |
| 5,710,972 | 1/1998 | Lin ........................................ 455/525 |
| 5,754,953 | 5/1998 | Briancon et al. . |

*Primary Examiner*—Nay Maung
*Assistant Examiner*—Sonny Trinh
*Attorney, Agent, or Firm*—Philip P. Macnak

[57] ABSTRACT

A method in a communication system (100) having at least a first and a second base stations (104, 108) for communicating with selective call devices (102) includes the steps of transmitting a first signal on a first frequency that indicates an alternate frequency and transmitting second signal on the alternate frequency indicated by the first signal. The second signal has a registration threshold for controlling registration of the selective call device (102) with the second base station (108).

24 Claims, 5 Drawing Sheets

| LSB | BIT POSITION | | | | | | | | | | | | | | | | | | | MSB |
|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 |
| $x_0$ | $x_1$ | $x_2$ | $x_3$ | 0 | 0 | 0 | 1 | $ac_0$ | $ac_1$ | $s_0$ | $s_1$ | $s_2$ | $s_3$ | $s_4$ | $s_5$ | $s_6$ | $s_7$ | $s_8$ | $s_9$ | $s_{10}$ |

| LSB | BIT POSITION | | | | | | | | | | | | | | | | | | | MSB |
|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 |
| $x_0$ | $x_1$ | $x_2$ | $x_3$ | r | r | RD | LE | $v_0$ | $v_1$ | $v_2$ | $v_3$ | $v_4$ | $v_5$ | $v_6$ | $v_7$ | $c_0$ | $c_1$ | $m_0$ | $m_1$ | $m_2$ |

| LSB | BIT POSITION | | | | | | | | | | | | | | | | | | | MSB |
|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 |
| $x_0$ | $x_1$ | $x_2$ | $x_3$ | 1 | 0 | 0 | 1 | 0 | 0 | 0 | r | r | r | $e_0$ | $e_1$ | $e_2$ | $e_3$ | $e_4$ | $e_5$ | $e_6$ |

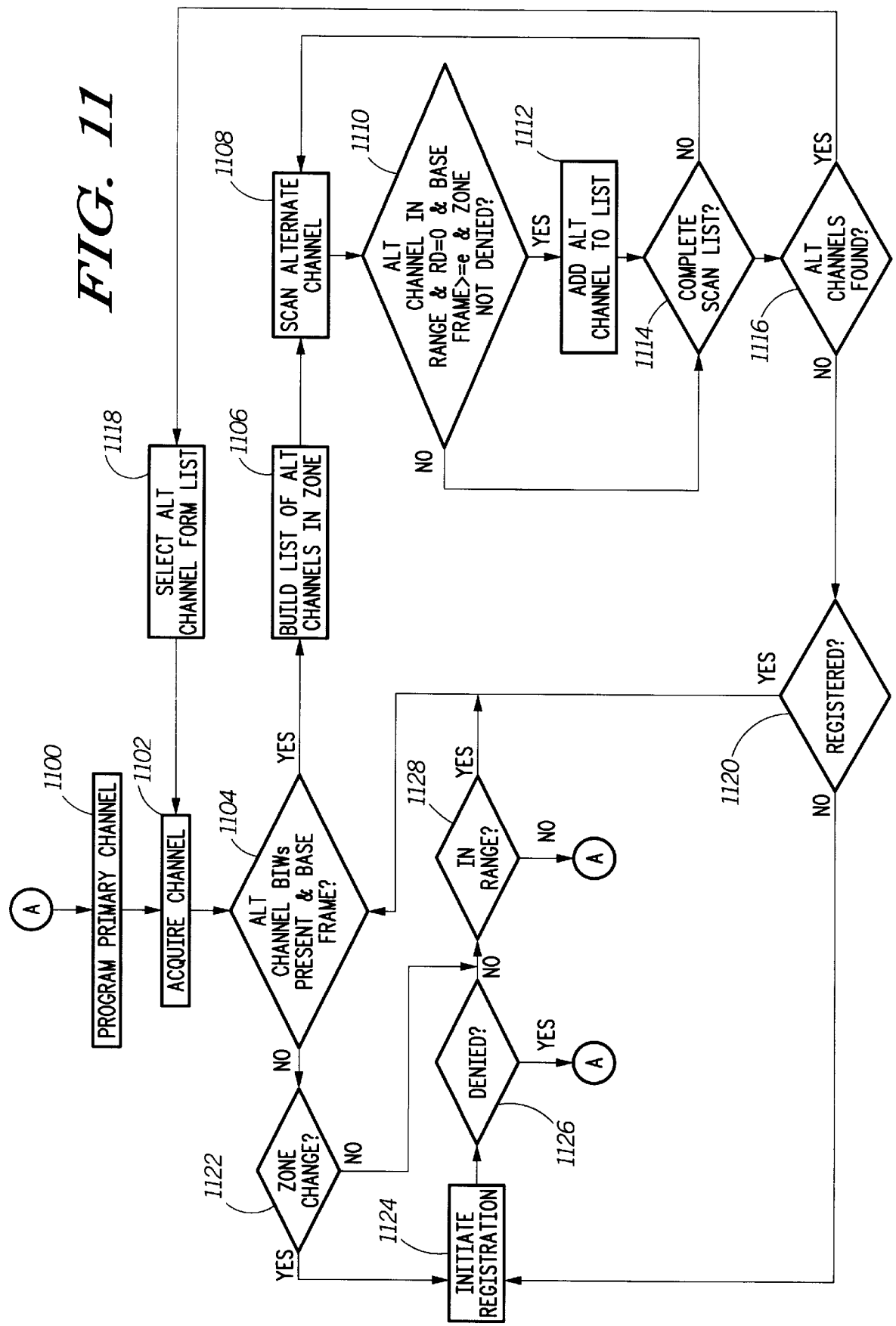

COMMUNICATION SYSTEMS FOR CONTROLLING REGISTRATION OF SELECTIVE CALL DEVICES

FIELD OF THE INVENTION

This invention relates in general to communication systems, and more particularly to a method for controlling registration of selective call devices.

BACKGROUND OF THE INVENTION

The coverage area of a conventional communication system, e.g., selective call communication system, can be divided into zones and sub-zones in which a subscriber unit, e.g., selective call device, is to be located. Additionally, zones of services ("underlay zones") can have localized overloading pockets, for example, at a shopping mall, office buildings, hospitals, large businesses, etc. To circumvent the overloading on the zones of services caused by localized overloading, sub-zones ("puddle zones") can be created within an underlay zone to provide service and reduce the overloading on the underlay zone.

As the selective call device moves from one zone or sub-zone to another, the selective call device registers with the system by transmitting registration information back to the base station that is located in the selective call device's new zone or sub-zone. In a 2-way selective call communication system, for example, a selective call device registers with the system via an ALOHA registration packet that the selective call device transmits on a reverse channel. By detecting the registration packet, the communication system knows where the selective call device is located and can address the selective call device in its known zone or sub-zone location.

The creation of sub-zones ("puddle zones") within a main zone ("underlay zone") causes an increase in the number of registrations by the selective call devices. When too many selective call devices are attempting to register, for example, in a newly created sub-zone, the registration process will be overloaded. Thus, what is needed in a cost effective and simple method for alleviating or preventing registration overload when too many selective call devices are attempting to register in an underlay or a sub-zone communication area of the selective call communication system.

BRIEF DESCRIPTION OF THE DRAWINGS

FIG. 11 is a flow diagram illustrating the operation of the selective call device in accordance with the preferred embodiment of the present invention.

DESCRIPTION OF THE PREFERRED EMBODIMENT

Figure 1:
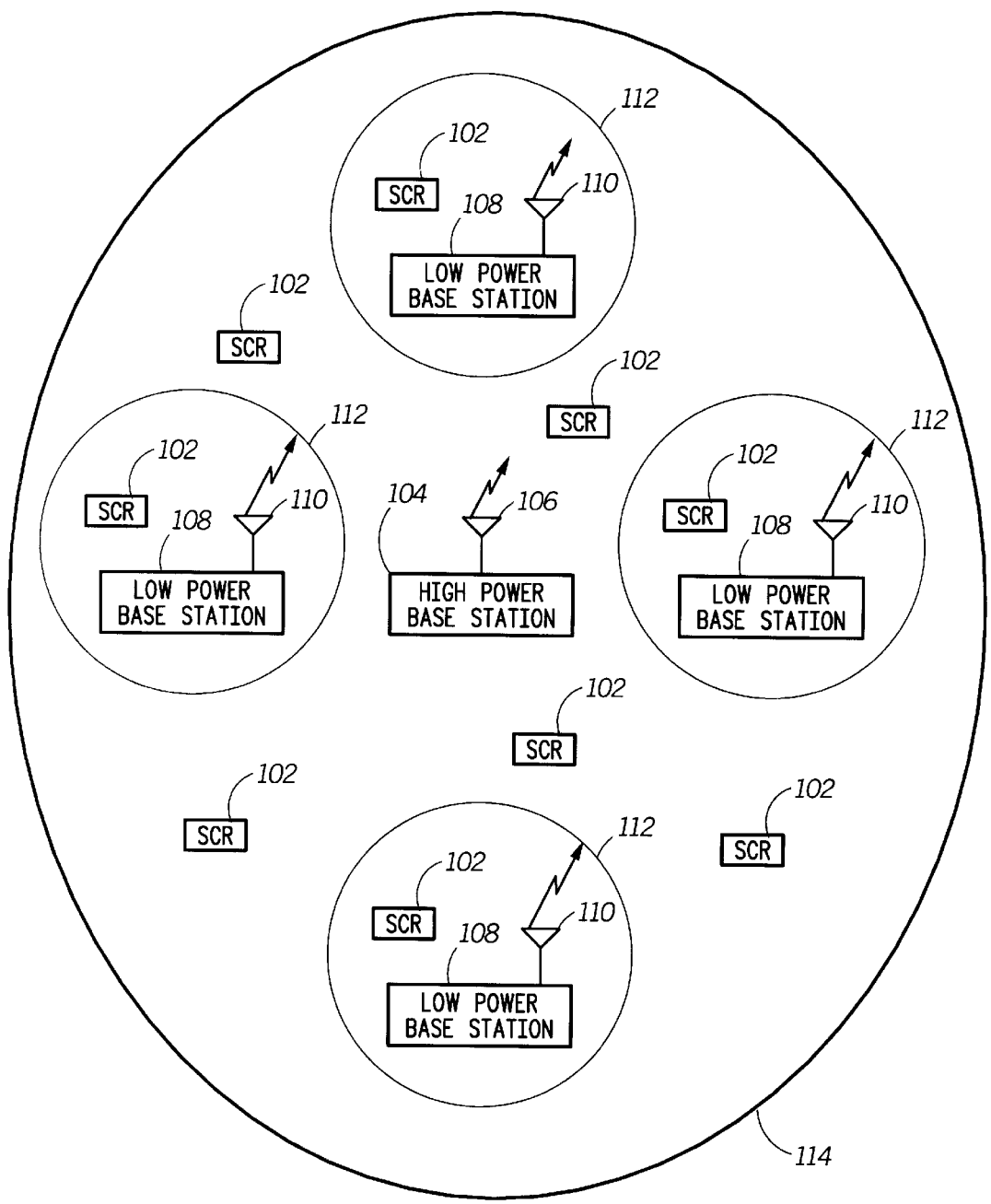
FIG. 1 is a block diagram of coverage areas of a communication system that operates in accordance with the preferred embodiment of the present invention.

FIG. 1 is a block diagram of coverage areas of a communication system that operates in accordance with the preferred embodiment of the present invention. The illustrated communication system 100, e.g., a selective call communication system, includes a relatively high power base station 104 and an antenna 106. As is well known, the high power base station 104 includes at least a receiver and a transmitter for receiving and transmitting messages or information, e.g., on a given frequency, for selective call devices 102 located within a relative wide coverage area or zone 114 ("underlay zone"). The selective call device 102 is well known in the art and can be referred to as a subscriber unit that has a receiver and/or a transmitter. According to the preferred embodiment of the present invention, the selective call communication system 100 can include one or more low power base stations 108 and antennas 110 that include at least a receiver and a transmitter for receiving and transmitting messages, e.g., on an alternate or different frequency or alternate or different set of time slots (frames) of the same frequency (from that of the underlay zone) to the selective call devices 102 located within one of the smaller coverage areas or zones 112 ("puddle zones") that overlaps or is within the wide coverage area or underlay zone 114.

The high power transmitter of the base station 104 is coupled to a conventional transmitting antenna 106 for transmitting selective call messages to the selective call devices 102 located anywhere within the underlay coverage zone 114, including selective call devices 102 that are located within the puddle zones 112. Radio frequency (RF) signals are transmitted by a high power transmitter of the base station 104 utilizing conventional means, for example, frequency shift-keyed (FSK) signals for transmitting digitized messages. Similarly, each low power transmitter of the base station 108 is coupled to a conventional transmitting antenna 110 for transmitting information, including message codes and/or conventional messages, for selective call devices 102 located within its own small coverage area or puddle zone 112. RF signals are transmitted by the low power transmitter of the base station 108 utilizing preferably the same modulation scheme used by the high power transmitter of the base station 104 of the underlay zone 114 but on a different frequency or time slot. In contrast to the high power transmitter of the base station 104, the low power transmitter of the base station 108 has a limited or smaller transmission range for RF signals that can be intercepted by the selective call devices 102. This range is preferably limited to the boundary of the small coverage area of the puddle zone 112. To increase system messaging capacity, puddle zones 112 of different frequencies are introduced in preferably high traffic areas within existing wide-area underlay zone 114. Puddle zones 112 preferably operate on alternate or different channel frequency or time slots from the channel frequency of the underlay zone 114. The channel frequencies of the puddle zones 112 are specified using preferably the block information words (BIW) of a primary or underlay zone channel (to be discussed in details). Selective call devices 102 within the coverage area of an underlay zone 114 will preferably background scan to detect alternate channels when these channels are listed in the block information words (BIW) of the underlay zone's channel.

If the selective call device 102 detects an alternate channel with sufficient signal quality to be considered "in-range" and if the selective call device 102 is allowed to register on the channel, the selective call device 102 will register for service using the zone ID of the associated puddle zone 112.

Due to the benefits of frequency reuse, it is possible that several puddle zones 112 within the same underlay zone 114 can share or use the same alternate channel or frequency. The flow of registrations is independently controlled in each puddle zone 112 using information transmitted on the BIW of the alternate channel within each puddle zone. As a result, a scanning selective call device 102 may be blocked from registration in one puddle zone while being allowed to register in another even though both puddle zones 112 appear to be "in-range" to the selective call device.

Figure 2:
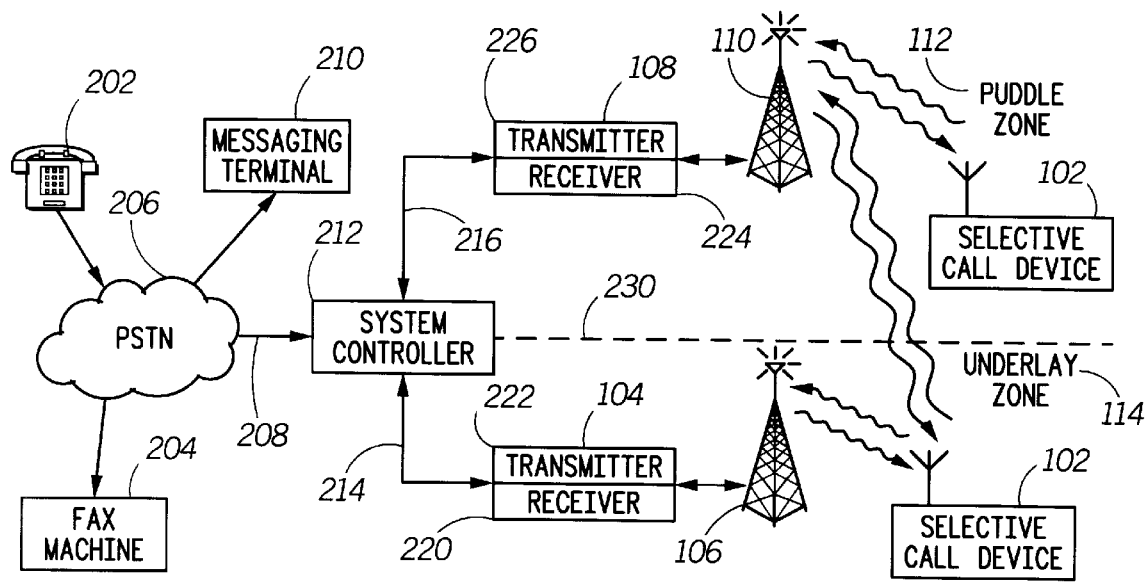
FIG. 2 is an electrical block diagram of the communication system according to the preferred embodiment of the present invention.

Referring to FIG. 2, a communication system 200 is shown according to the preferred embodiment of the present invention for transmitting information between base stations 104, 108 and subscriber units or selective call devices 102. The communication system 200 is a preferably a selective call communication system for transmitting messages and other information to the selective call devices 102 or transceivers (subscriber units) that subscribe to the selective call communication system. The concept of this invention is also useful with other forms of one-way and two-way communication systems.

A message can originate, e.g., from a conventional telephone 202, a facsimile machine 204 or a messaging terminal 210 connected through a conventional public telephone switch network (PTSN) 206 by conventional telephone links 208 to a system controller 212. The system controller 212 oversees the operation of a plurality of radio frequency base stations 104, 108 and transmitters/receivers through one or more communication links 214, 216 that can include, e.g., twisted pair telephone wires, fiber optics or other forms of high quality audio communication links. The system controller 212 encodes and decodes inbound and outbound telephone addresses into formats that are compatible with land line message switch computers. The system controller 212 also encodes and schedules outbound messages, which can include such information as analog voice messages and digital alphanumeric messages, for reception and transmission by the transmitters/receivers 222, 226/220, 224 to the selective call devices 102 using antennas 106, 110. The system controller 212 decodes inbound messages, including unsolicited and response messages received by a transmitters/receivers 222, 220 from the selective call devices 102.

Referring to the selective call devices 102, each of them (and all other subscriber units that are assigned to the illustrated communication system) has at least one unique address assigned to it. This unique address permits the transmission of a message to be received only by the addressed selective call devices 102.

The coverage area of a communication system is typically divided into zones, and possibly sub-zones. Such use of zones is illustrated in FIG. 2 wherein a line 230 shows the boundary between the underlay zone 114 and the puddle zone 112. In operation, the base stations 104 or 108 send information to the selective call devices on a forward channel using a synchronous frame structure, and the selective call devices 102 send response or request signals and other information to the base stations on a reverse channel. The signaling protocol for that type of two-way communication is described in U. S. application Ser. No. 08/498212, filed Jul. 5, 1995 and assigned to the assignee of this invention. The teachings of that Application are incorporated herein by reference. The following brief description of the signaling protocol will suffice for purposes of explaining the present invention.

The high power base station 104 transmits, in simulcast mode and on the forward channel, WRU (Where Are You?) inquiries that are addressed to selective call device 102 for which messages are waiting. A selective call device 102 that receives the WRU inquiry automatically sends back, on the reverse channel, an acknowledgment that identifies the base station(s) whose WRU was received by the selective call device 102. That identified base station(s) then transmit(s) the message to that selective call device 102 that responded to the WRU signal. If a selective call device 102 does not respond with an acknowledgment, the base station waits for a period of time (the re-try interval) and re-sends the WRU. This cycle repeats a selected number of times until the intended selective call device 102 acknowledges receipt of the WRU, receives its message, and acknowledges receipt of its message.

When a selective call device 102 moves from one zone to another, it can be detected by determining which base station signal it is receiving. Upon determining that it has changed zones or sub-zones, it transmits an ALOHA registration packet (see the above-referenced Application for a description of ALOHA transmissions and registration packets) to the base station in the new zone.

Figure 3:
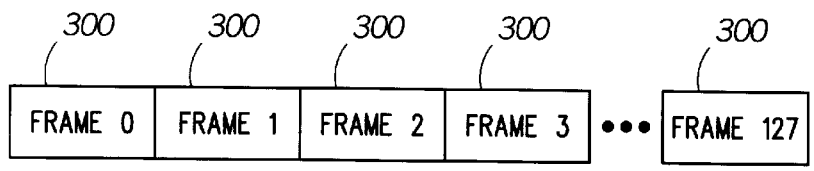
FIGS. 3 and 4 are timing diagrams depicting a preferred communication protocol used by the communication system of FIGS. 1 and 2.
Figure 4:
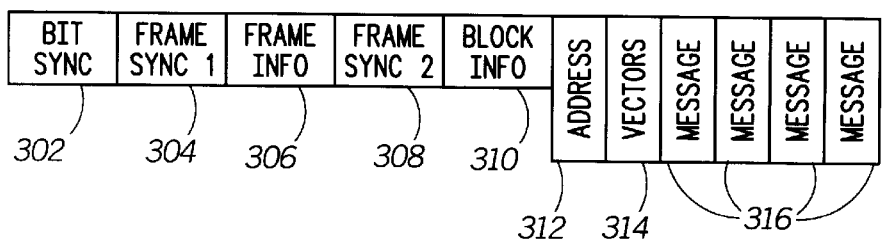

FIGS. 3–4 show timing diagrams of a synchronous signal in accordance with the preferred protocol for transmitting selective call messages according to FIGS. 1 and 2. Referring to FIG. 3, the selective call signal, for example the FLEX® protocol, comprises of a number of, preferably one-hundred-twenty-eight (128), message packets or frames 300. Each frame 300 is preferably 1.875 seconds in duration and has a preferred base data rate of 6400 bits-per-second. Although, it will be appreciated that other data rates can be used including the ability to use multiple data rates.

Referring to FIG. 4, each frame 300 is comprised of a bit sync signal 302, preferably 32 bits of alternating 1,0 pattern, followed by a FRAME SYNC #1 signal 304 preferably one of several predetermined thirty-two bit words, and a FRAME INFO signal 306, preferably one thirty-two bit word having twenty-one variable information bits containing information such as a cycle number and a frame number. The BIT SYNC signal 302 provides bit synchronization to the selective call device(s) 102 while the FRAME SYNC #1 signal 304 provides frame synchronization and includes a signal indicative of the data rate of the message information.

Following the FRAME INFO word 306 is a FRAME SYNC #2 signal 308. Following the FRAME SYNC #2 signal 308 is a block info word (BIW) signal 310 including information such as the number of priority addresses, end of block information field, vector start fields, and frequency allocations or alternate frequencies for puddle zones. The code word of each frames 300 is preferably encoded as 31,21 Bose-Chaudhuri-Hocquenghem (BCH) code words having twenty-one information bits and ten parity bits generated according to the well known BCH algorithm. An additional even parity bit extends the word to a 32,21 code word. The addresses are located in block 312 and the vectors pointing to the messages, if applicable, are located in block 314 and the messages are located in the remaining blocks 316. Preferably, all of the address signals within the frame are located in a first portion 312 and the information or message signals are located in a subsequent portion of the block 316. Words 312–316 are shown in a vertical orientation to indicate that these words can be interleaved in order to improve the immunity of the transmission to burst errors. It is understood by one of ordinary skill in the art that interleaving may be modified or eliminated.

When the base stations 104, 108 transmit information to a selective call device 102, the messages are referred to as out-bound messages, and when the selective call devices 102 transmit messages to the base stations, the messages are referred to as in-bound messages. The outbound syncs 302 and 304 are used by the selective call devices 102 for bit and frame synchronization respectively utilizing techniques well known in the art. The block information word (BIW) 310 includes the alternate frequencies of the puddle zones where available according to the preferred embodiment of the present invention.

Figures 5, 6, 7, 8:
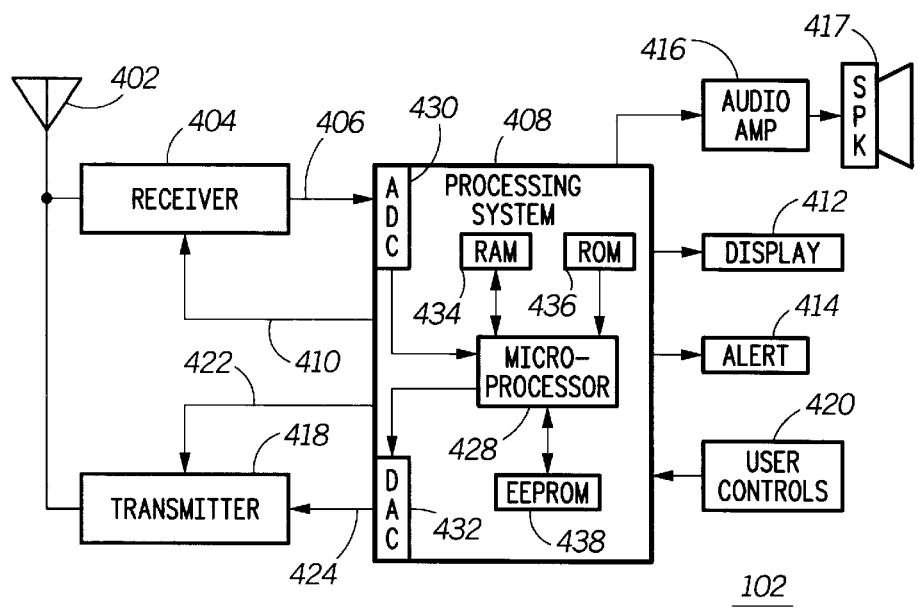
FIG. 5 is an electrical block diagram of a selective call device according to the preferred embodiment of the present invention.
FIGS. 6–8 are more detailed timing diagrams illustrating the preferred communication protocol used by the communication system of FIGS. 1 & 2.

Referring to FIG. 5, an electrical block diagram of a selective call device 102 is shown which is programmed to operate in accordance with the preferred embodiment of the present invention. The selective call device 102 includes an antenna 402 for intercepting and transmitting radio signals. The antenna 402 is coupled to conventional receiving circuitry (receiver 404) which filters the incoming signal to remove undesirable energy at off-channel frequencies, amplifies the filtered signal, frequency converts the signal, and demodulates it in a conventional manner to generate a demodulated signal on lead 406 which is coupled to a processing system 408. The receiver 404 also has a power control input 410 coupled to the processing system 408.

The processing system 408 is conventionally coupled to a display 412, to an alert 414, to an audio amplifier 416 which drives a speaker 417, to a transmitter 418, and to a set of user controls 420. The transmitter 418 is coupled to the processing system 408 by a connector 422 that carries a demodulated signal, and by a connector 424 that carries a channel control signal. The output of the transmitter 418 is coupled to the antenna 402.

The processing system 408 includes a microprocessor 428 which is coupled to an analog-to-digital converter (ADC) 430, a digital-to-analog converter (DAC) 432, a random access memory (RAM) 434, a read only memory (ROM) 436, and an electrically erasable programmable read only memory (EEPROM) 438. The microprocessor 428 is preferably a model HC 11 made by Motorola, Inc.

The demodulated signal from the receiver 404 is coupled to the ADC 430 which converts the demodulated signal from an analog signal to a digital signal in a conventional manner for processing by the processing system 408. When the demodulation signal is an analog signal, the analog signal is converted to a digital signal using an analog-to-digital conversion technique such as adaptive differential pulse code modulation (ADPCM). A bit recovery function converts digital signals to binary data in a conventional manner. A synchronization function acquires and maintains bit, word, block, frame, and cycle synchronization with the outbound signaling protocol in a conventional manner. A further description of the specifics of the selective call device 102 can be found in the above-referenced Application. Suffice it to say that the microprocessor 428 is programmed via instructions stored in the ROM 436 to operate in accordance with the preferred embodiment of the present invention. Registration and alternate frequency allocation information preferably received over-the-air are be stored in the RAM 434, in the EEPROM 438, or in any other suitable form of memory.

Preferably, each subscriber unit or selective call device 102 stores, in its memory, an indication of the registration interval. It determines when it is receiving the forward channel signals from the underlay zone 114, and when it is able to acquire the forward channel signals from a puddle zone 112. In order for the system to inform the selective call device 102 that a puddle zone base station is available, the base stations transmit a block information word as shown in FIGS. 6–8. The availability of alternate channels or a puddle zone 112 within an underlay zone 114 is transmitted to selective call device 102 by information broadcast on a primary channel of the underlay zone 114. The selective call device 102 can register for service on an alternate channel if it is "in-range" of the puddle zone base station or transmitter. A "registration threshold" parameter is preferably broadcast on the alternate or puddle zone channel to regulate, control, or stream line the flow of registrations to the puddle zone.

Referring to FIG. 6, the block information word (BIW) 310 is used not only to alert, notify, or indicate to the selective call devices 102 the zone in which they are operating but also, according to the preferred embodiment, to alert, notify, or indicate to the selective call device the existence of alternate channels by listing, e.g., "Alternate Channels BIW" on the channels servicing an underlay zone 114. The BIW 310 is transmitted on the underlay frequency by the base station 104 to inform the selective call devices 102 of the existence of the alternative frequencies. Bit positions 9 and 10 ("$ac_0$" and "$ac_1$") are used to identify the alternate channel logical number [0, 3]. A maximum of four alternate channels can be listed with two bits. Bit positions 11–21 ("$s_0, s_1, \ldots s_{10}$") are the forward channel assignment [0, 2047] used to specify or calculate the center frequency of the 50 kilohertz (kHz) wide alternate channel. The center channel can be calculated for a 50 kHz ReFLEX™ 50, e.g., as follows:

$$Fc = 929.015 \text{ megahertz (MHz)} + s*10 \text{ kHz}.$$

where Fc is the center frequency of the alternate channel; 929.015 MHz is the base frequency of the ReFLEX 50 channel; and 10 KHz is the channel spacing.

Therefore, the selective call device 102 receiving the BIW on the underlay channel can determine from bits 9 and 10 that there are existing puddle zones within the underlay channels.

Referring to FIG. 7, the block information word 310 is an example of the BIW transmitted on the alternate channel of the puddle zone 112 to control the flow of registration of selective call devices in a puddle zone. Bit position 7 is the registration deny ("RD") bit which when set, e.g., equal to 1 informs the scanning selective call devices not to attempt to register in this sub-zone or puddle zone 112. However, selective call devices 102 that are already registered in the puddle zone, will remain registered and will continue to receive service although the RD bit has been set to 1 subsequent to their registrations. Setting the RD bit controls only the registration of selective call devices 102 not already registered with the puddle zone base station. When the RD is set to 1, all unregistered selective call devices 102 know not to attempt to register in that sub-zone. If there are other puddle zones, the selective call device 102 can continue scanning for those other sub-zones. Selective call devices 102 that are currently registered in a sub-zone when the RD bit becomes set, e.g., to 1 will remain registered and will continue to receive service. Alternately, when the RD is set to 0, all selective call devices 102 can attempt registration in this zone depending on a Registration threshold "e" (to be described in reference to FIG. 8). Bit position 8 is the global registration acknowledgment bit ("LE"). When the LE bit is set to 1 all currently unregistered selective call devices will enter the registered state and discontinue any activity associated with current registration attempts with the base station or system of the puddle zone. If the LE bit is set equal to 0, then all unregistered selective call devices 102 will follow an aggressive registration procedure.

When a selective call device loses an alternate channel, e.g., because of the out of range condition and if the selective call device re-acquires the same alternate channel with the same zone identification number ("ID") and LE=1, the selective call device can consider itself to be registered in that zone and can continue receiving information on that channel without attempting to re-register. If LE=0 on the alternate channel (the puddle zone), the selective call device can register in the zone, even if LE=1 on the underlay channel.

Referring to FIG. 8, an example according to the preferred embodiment of the present invention of the BIW is shown. The BIW is transmitted on the alternate channel to control the flow of registrations into the zone, e.g., puddle zone associated with an alternate channel. Bit positions 15 to 21 contain the registration threshold bits ("$e_0, e_1, \ldots e_6$") of the BIW that are used to regulate or control the flow of registrations into a sub-zone.

When the registration threshold bits are set, and the selective call devices' base or assigned frame is equal-to-or-greater-than the value of the registration threshold bits then selective call device can register in the puddle zone. When this BIW is not be transmitted, the default value of the registration threshold bits (e bit) is equal to 0. Registrations into a zone are controlled through the use of the "RD" (Registration Denied) bits transmitted in BIW (FIG. 7) and the "e" (Registration Threshold) parameter which is transmitted in the BIW for registration control (FIG. 8). If it is necessary to stop the flow of registrations into a puddle zone, the "RD" bit for the zone can be set and no more registrations will occur or will be allowed. Selective call devices that detect the zone will continue to background scan with the same behavior as if the zone was out-of-range.

In this way, when it is desirable to allow registrations again, a registration flood can be avoided by clearing the "RD" bit while setting the registration threshold "e" parameter to, e.g., 127. Therefore, only those selective call devices that are within range and that have a base or assigned frame numbered equal-to-or-greater than 127 are able to register. After these selective call devices 102 have registered into the zone or a predetermined time period, the registration threshold ("e" parameter) can be reduced to, e.g., 126 and held at this value until all selective call devices within range that have a base frame number equal-to-or-greater-than 126 are able to register. This process can continue over time until the registration threshold parameter "e" is 0. At this value all selective call devices within range can register and the BIW for registration control can be removed from the channel (default e=0).

With this invention, group registration control has the advantage that it requires no system involvement for individual selective call device, requires no additional bandwidth to deny registrations and has no "memory" conditions which may be problematic. It is also useful for controlling registration floods that may occur when deploying a new alternate channel in an underlay zone.

Figures 9, 10:
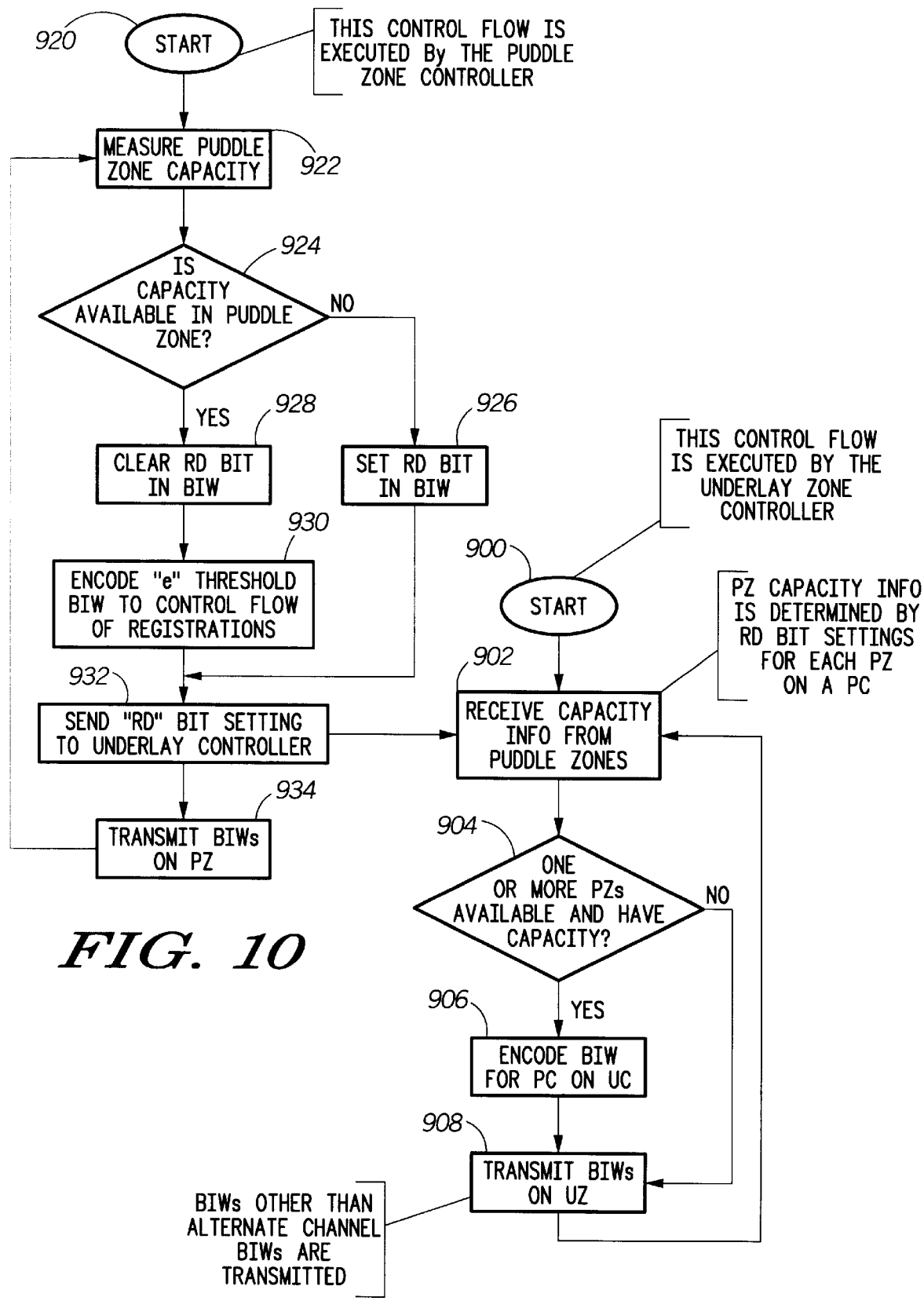
FIGS. 9–10 are flow diagrams illustrating the operation of the communication system in accordance with the preferred embodiment of the present invention.

Referring to FIGS. 9–10, flow diagrams are shown illustrating the operation of the selective call communication system in accordance with the preferred embodiment of the present invention. FIG. 9 is the preferred flow diagram of the high power base station and transmitter portion of the communication system according to FIG. 1. In the start block, the control flow and initialization of the base station 104 of the underlay zone 114 are executed, step 900. If the coverage area 114 includes at least one puddle zone 112, capacity and other control information are received from the puddle zone base station 108, step 902. It is appreciated that the capacity and other control information can be provided from the puddle zone base station to the underlay base station via wireless or wireline connection or any other feasible method for providing same. The puddle zone 112 capacity information is indicated by the registration denied (RD) bit. The RD bit is included in the BIW transmitted on the puddle zone channel within the puddle zone 112 coverage area as shown in FIG. 7. The base station 104 of the underlay zone 114 checks or determines if one or more puddle zones 112 of the underlay zone 114 is available and has capacity for facilitating registrations, step 904. In can be appreciated that the underlay zone base station can alternatively encode the BIW with the puddle zone even if the puddle zone is not available, i.e., RD=1. However, according to the preferred embodiment, if at least one puddle zone 112 is available and has capacity (e.g., RD=1), the underlay base station 104 processes and encodes the BIW of the underlay zone 114 (FIG. 6) with the frequencies or some other indication of the puddle zone channel that is available for communication, step 906. On the other hand, when there are no available puddle zones in the underlay zone, the process skips from block 904 to block 908. In step 908, the BIW is transmitted in the underlay zone coverage area 114 as shown in FIG. 6 indicating whether any puddle zones are present and available. An available puddle zone 112 is indicated in bit positions 9–10 of the BIW of FIG. 6 in the underlay zone.

Referring to FIG. 10, the preferred operation of the low power base station of the puddle zone is shown. In step 920, the control flow and initialization process is performed by the puddle zone base station 108. The puddle zone capacity is measured, e.g., the number of selective call devices 102 that are registered in the puddle zone and/or the message rate, step 922. A high message rate could be, e.g., a message-per-unit time that approaches the capacity of a processor in the base station 108. After the capacity of the puddle zone has been checked, step 924 determines if there is available capacity of the puddle zone. If not, the RD bit is set (=1) in the BIW (FIG. 7) to indicate to the selective call devices 102 that no more registration attempts should be made on this puddle zone channel, step 926. The process continues to block 932.

On the other hand, at step 924, when there is available capacity, the RD bit is cleared (=0) to allow unregistered selective call devices to register on the puddle zone channel, step 928. The puddle zone base station determine (e.g., based on current registration process capacity) what portion or the number of the total of all selective call devices that should be allowed to register simultaneously. The registration is controlled by a registration threshold ("e" parameter). In ReFLEX, there are 0–127 frames, and by setting the registration threshold equal to, e.g., 127, only the selective call devices that are assigned to frame 127 will be able to register even though the RD bit is cleared, step 930. As can be appreciated by one skill in the art, the registration threshold is continuously reduced until the registration threshold in equal to zero. A zero registration threshold value allows all selective call devices to register on the puddle zone channel. It can be further understood that the registration threshold can be reduced linearly or non-linearly as determined by the base station 108 of the puddle zone 112. When the puddle zone processor or controller determines that there is available capacity, the puddle zone base station transmits (e.g., via wireless or wireline) the information to the underlay zone 114, step 932. The underlay zone will include the puddle zone ID in its BIW (FIG. 6) to enable selective call devices receiving the BIW to determine if a puddle zone is within range and to attempt to communication on the puddle zone channel. Once the BIW is encoded, it is transmitted on the puddle zone channel according to FIGS. 7 & 8 indicating the registration threshold ("e" parameter) to control or manage the registration process on the puddle zone channel, step 934.

To increase system messaging capacity, puddle zones are introduced in high traffic areas within existing wide-area underlay zones. The puddle zones operate on alternate channel frequencies that are specified using block information words (BIW) of a primary (underlay) channel. Selective call devices 102 that are within the coverage area of an underlay zone can preferably back-ground scan to detect alternate channels listed in the block information words of the underlay zone's channel. When the selective call device 102 detects an alternate channel with sufficient signal quality/strength to be considered "in range," the selective call device checks the RD bit to determine if it is allowed to register on the channel. When the RD bit is set to zero, the selective call will register for service using the zone ID of the associated puddle zone after checking the registration threshold.

Frequency reuse makes it possible for several puddle zones within the same underlay zone to share the same alternate channel. Therefore, flow of registrations is independently controlled in each puddle zone using information transmitted on the alternate channel on its puddle zone. As a result, a scanning selective call device can be blocked from registration in one puddle zone while being allowed to register in another even though both puddle zones appear to be "in range" to the selective call device 102.

The registration threshold or the "e" parameter of FIG. 8, bits number 15-to-21 is used control the flow of registration. As is well known, with the FLEX® protocol, there are 0–127 frames, therefore, for example, by setting the registration threshold ("e" parameter) to 100, only selective call devices that are assigned to a frame number equal-to-or-greater than 100 will be able to register. When all selective call devices with a frame number of 100 or higher are registered, the registration threshold value is reduced, e.g., to 75, allowing all selective call devices 102 assigned to frames number 75 or higher to register. This process can continue until the puddle zone becomes filled to capacity or until the registration threshold is set to zero permitting all selective call devices to register. Alternatively, when the puddle zone is filled to capacity, the RD bit is set to 1 which prevents any further registration into the puddle zone.

Referring to FIG. 11, a flow diagram is shown illustrating the operation of the selective call device in accordance with the preferred embodiment of the present invention. Once the selective call device 102 powers-up and is initialized, it retrieves its channel list, step 1100, and then attempts acquire the channel, step 1102. The selective call device 102 detects if any puddle zone channel BIWs are present on the underlay channel, step 1104. Puddle zone alternate channels are indication by bit numbers 9 and 10 of the BIW of the underlay channel (FIG. 6). If so, the selective call device 102 builds a list of the puddle zone channels that are to be scanned while in the underlay zone, step 1106. The selective call device begins to scan the channels of the puddle zone preferably in back-ground mode, step 1108. The selective call device continues to receive the underlay channel while it is scanning in the back-ground to determine available puddle channels. When the selective call device scans and begins receiving alternate channels (puddle channels), it determines if the puddle zone channels are in range, preferably by measuring the signal-to-noise ratio (or any other suitable techniques) of the puddle channel, step 1110. When the signal to noise ratio is above a predetermined threshold, the channel is determined to be in range. When the channel is in range, the selective call device decodes the RD bit and the registration (threshold) parameter "e". The selective call device is allowed to register when the RD bit is zero and the registration threshold is equal to or greater than the assigned frame number of the selective call device. If either one of these conditions is not satisfied, the process continues to step 1114. Alternately, when both variables are satisfied, the puddle or alternate channel is added to the list of the selective call device, step 1112. At step 1116, the selective call device determines if all the puddle channels have been scanned. If not, the process returns to step 1108 to continue scanning. If the scan list is completed in step 1114, the selective call device determines if any puddle channels were found and were available, step 1116. If yes, the process continues to step 1118 where the selective call device selects the available puddle channel from the scan list, and begins to acquire the puddle channel, step 1102.

Returning to step 1116, when no alternate or puddle channels were found, the selective call device determines if it is registered in the underlay zone that it is currently receiving a selective call signal, step 1120. If not, it initiates registration at step 1124. If yes, it returns to step 1104. Returning to step 1104, when the selective call device 102 fails to detect a puddle zone channel BIWs on the underlay channel, it proceeds to step 1122 where it determines if it has changed zones. If yes, the registration process is initiated, step 1124. At step 1126, if registration is denied, the process continues to step 1100 to program the underlay (primary) channel. However, if registration was not denied, step 1126, or there is no zone change from step 1122, the selective call device checks preferably the signal to noise ratio to determine if the channel is in range, step 1128. If the channel is not in range, the process continues to step 1100 to program the underlay channel. On the other hand, the when the channel is in range, the process continues to step 1104 where the selective call device 102 detects if the puddle zone channel BIWs are present on the underlay channel.

In this way, the invention provides a method and apparatus for facilitating automatic roaming to alternate channels servicing smaller coverage zones (puddle zones) that are contained within larger coverage zones (underlay zones). Also, because of frequency reuse, multiple puddle zones within a larger underlay zone use the same alternate channel or frequency. The registration denied bit allows the puddle zones to be able to control the flow of registrations into each puddle zone independently of other puddle zones and the underlay zone and the registration threshold is used to regulate registration "floods" that can occur when a channel becomes enabled for registration after being unavailable.

In order to increase an existing system messaging capacity, the puddle zones are introduced in high traffic areas within existing wide area underlay zones. Puddle zones operate on alternate or different channel frequencies that are specified using the block information words of a primary channel. The selective call devices that are within the coverage area of an underlay zone will background scan to detect the alternate channels if these channels are listed in the block information words of the underlay zone's channel. When the selective call device detects an alternate channel with sufficient signal quality to be considered "in range" and if the selective call device is allowed to register on the channel, the selective call device will register for service using the zone ID of the associated puddle zone. The flow of registrations is independently controlled in each puddle zone using information transmitted on the alternate channel of each puddle zone. As a result, a scanning selective call device can be blocked from registration in one puddle zone while being allowed to register in another even though both puddle zones appear to be "in range" to the selective call device.

In summary, the communication system communicates with selective call devices on at least a first and a second base stations. A first base station has a first transmitter for transmitting a first signal on a first frequency indicating an alternate frequency. A second base station has a second transmitter for transmitting a second signal on the alternate frequency indicated by the first transmitter. The second signal includes a registration threshold for controlling registration of the selective call devices with the second base station. The second transmitter also transmits a registration deny bit indicating that the selective call devices should not attempt registration with the second base station and a signal indicating that there is available capacity in the second base station. The second base station also includes a processor for setting a first value for the registration threshold and a controller for varying the registration threshold. The controller varies the registration threshold by decreasing the registration threshold from the first value to permit more selective call devices to register with the second base station. The registration threshold includes, e.g., a frame assignment that is decreased and when the frame assignment is equal to or is less that the frame assignment of the selective call device, the selective call device can register with the second base station.

What is claimed is:

1. In a communication system having at least a first and a second base station, each having a transmitter for communicating with selective call devices, a method comprising the steps of:

transmitting a first signal on a first frequency from the first base station, the first signal indicating an alternate frequency; and further transmitting a second signal on the alternate frequency indicated by the first signal from the second base station, the second signal having a registration threshold for controlling registration of the selective call devices with the second base station.

2. The method according to claim 1 wherein the step of second transmitting transmits a registration deny bit indicating that the selective call devices should not attempt registration with the second base station.

3. The method according to claim 1 wherein the second step of transmitting transmits a signal indicating that there is available capacity in the second base station.

4. The method according to claim 1 further comprising the step of:

setting a first value for the registration threshold; and varying the registration threshold from the first value.

5. The method according to claim 4 wherein the step of varying the registration threshold comprises a step of decreasing the registration threshold from the first value to enable more selective call devices to register with the second base station.

6. In a selective call device having a receiver and a processor utilized for communicating with at least a first and a second base station on a first and an alternate frequency, a method comprising the steps of:

within the receiver, receiving on the first frequency a first signal indicating the alternate frequency;

within the receiver, further receiving on the alternate frequency indicated on the first frequency a second signal; and within the processor, decoding a registration threshold from the second signal for controlling registration of the selective call device on the alternate frequency transmitted by the second base station.

7. The method according to claim 6 wherein the step of second receiving receives a registration deny bit indicating that the selective call device should not attempt registration with the second base station.

8. The method according to claim 6 wherein the second step of receiving receives a signal indicating that there is available capacity in the second base station.

9. The method according to claim 6 wherein the step of decoding further comprising a step of comparing the registration threshold with a frame assignment to determine when the selective call device is able to register.

10. The method according to claim 9 wherein the step of decoding decodes a registration deny bit received from the second signal to determine if the selective call device should attempt to register with the second base station.

11. The method according to claim 6 further comprising a step of determining for determining when the second signal on the alternate frequency is within range of the selective call device.

12. A communication system having at least a first and a second base stations for communicating with selective call devices, comprising:

a first base station having a first transmitter for transmitting a first signal on a first frequency indicating an alternate frequency; and a second base station having a second transmitter for transmitting a second signal on the alternate frequency indicated by first signal, the second signal having a registration threshold for controlling registration of the selective call devices with the second base station.

13. The communication system according to claim 12 wherein the second transmitter transmits a registration deny bit indicating that the selective call devices should not attempt registration with the second base station.

14. The communication system according to claim 12 wherein the second transmitter transmits a signal indicating that there is available capacity in the second base station.

15. The communication system according to claim 12 wherein the second base station further comprises:

a processor for setting a first value for the registration threshold; and a controller for varying the registration threshold from the first value.

16. The communication system according to claim 15 wherein the controller decreases the registration threshold from the first value to permit more selective call devices to register with the second base station.

17. The communication system according to claim 12 wherein the registration threshold comprises a frame assignment.

18. The communication system according to claim 12 further comprises a controller for controlling registration by associating the registration threshold to a frame assignment of the selective call devices.

19. A selective call device communicating with at least a first and a second base stations on a first and an alternate frequencies, comprising:

a receiver for receiving a first signal on the first frequency indicating the alternate frequency and for receiving a second signal on the alternate frequency; and a processor for decoding a registration threshold from the second signal for controlling registration of selective call devices on the alternate frequency transmitted by the second base station.

20. The selective call device according to claim 19 wherein the processor decodes a registration deny bit indicating that the selective call device should not attempt to register with the second base station.

21. The selective call device according to claim 19 wherein the processor, in response to decoding a registration deny bit, determine whether there is available capacity in the second base station.

22. The selective call device according to claim 19 wherein the processor compares the registration threshold with a frame assignment of the selective call device to determine when the selective call device is able to register.

23. The selective call device according to claim 19 further comprising a microprocessor for determining when the second signal on the alternate frequency is within range of the selective call device.

24. The selective call device according to claim 19 wherein the processor decodes a registration deny bit received from the second signal to determine if the selective call device should attempt to register with the second base station.

* * * * *